United States Patent [19]

Lew

[11] Patent Number: 5,127,274
[45] Date of Patent: Jul. 7, 1992

[54] VORTEX FLOWMETER WITH VORTEX AMPLIFYING THROTTLE

[76] Inventor: Hyok S. Lew, 7890 Oak St., Arvada, Colo. 80005

[21] Appl. No.: 632,357
[22] Filed: Dec. 24, 1990
[51] Int. Cl.$^5$ .............................................. G01F 1/32
[52] U.S. Cl. .................................................. 73/861.24
[58] Field of Search ............ 73/861.22, 861.23, 861.24

[56] References Cited

U.S. PATENT DOCUMENTS 4,418,579 12/1983 Harrington ...................... 73/861.23
4,730,500 3/1988 Hughes ............................. 73/861.22

Primary Examiner—Herbert Goldstein

[57] ABSTRACT

A vortex shedding flowmeter includes a vortex generating bluff body of elongated cylindrical shape disposed across a flow passage, a vortex sensor with signal generating means disposed downstream of the vortex generating bluff body, and a throttling means for constricting the flow passage disposed downstream of the bluff body such that the constriction increases the velocity of fluid flowing past the vortex sensor greatly magnifying the lift forces acting on the vortex sensor and thereby increasing the sensitivity thereof, wherein the throttling means is provided with a bias force causing constriction of the flow passage when the bias force overcomes the fluid dynamic force of the fluid flow at low flow rates and fluid dynamic force of the fluid flow causes the constriction to open up when fluid dynamic force overcomes the bias force of the throttling means.

4 Claims, 3 Drawing Sheets

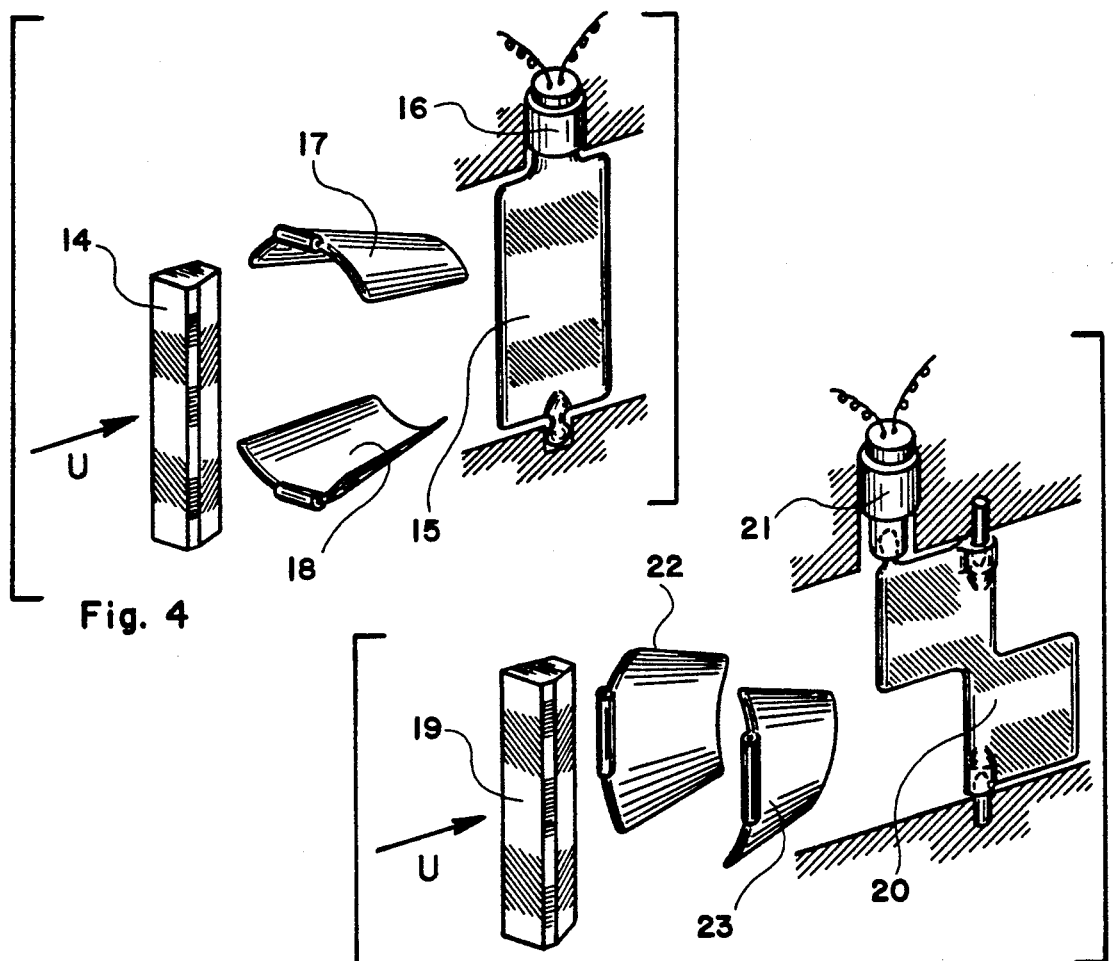
Fig. 4
Fig. 5
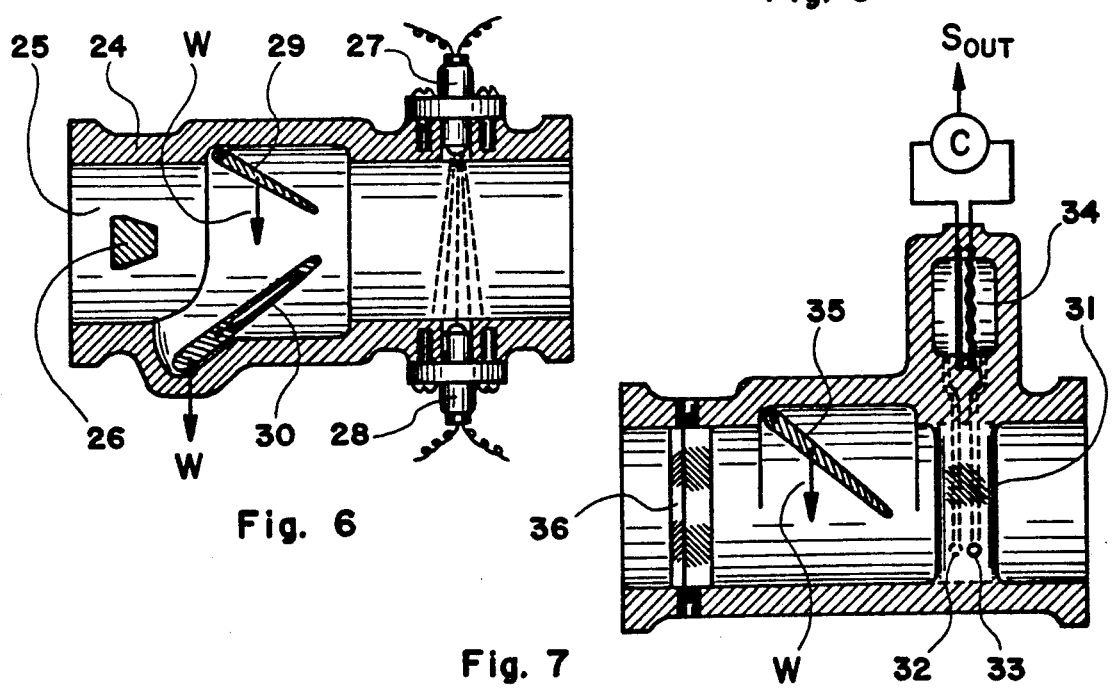
Fig. 6
Fig. 7

VORTEX FLOWMETER WITH VORTEX AMPLIFYING THROTTLE

BACKGROUND OF THE INVENTION

It is a well known and empirically proven fact that a state-of-the-art vortex shedding flowmeter is capable of operating with a turn-down ratio (the ratio of the maximum measurable fluid velocity to the minimum measurable fluid velocity) approaching 100 ti 1, measuring air flow under standard conditions as low as a few feet per second and water flow as low as a fraction of a foot per second. There is yet, however, a need and a desire in industry to develop vortex shedding flowmeters capable of measuring even lower velocities of fluid flows. Further lowering the minimum measurable fluid velocity is a very technically challenging task.

BRIEF SUMMARY OF THE INVENTION

The primary object of the present invention is to provide a vortex shedding flowmeter including a vortex generating bluff body, a vortex sensor disposed downstream of the bluff body, and a mechanical throttling means for increasing the flow velocity of fluid moving past the vortex sensor, wherein said mechanical throttle means for increasing flow velocity operates autonomously as a function of fluid flow, opening fully at high flow rates as a result of the dynamic fluid pressure, and closing down and constricting the flow passage at low flow rates due to a bias force.

Another object is to provide the vortex shedding flowmeter described in the primary object of the present invention, wherein the bias force causing constriction of the flow passage by the mechanical throttling means is a mechanical spring force.

A further object is to provide the vortex shedding flowmeter described in the primary object, wherein the bias force operating the mechanical throttling means is gravity force.

Yet another object is to provide the vortex shedding flowmeter described in the primary object, wherein the bias force operating the mechanical throttling means is a magnetic force.

These and other objects of the present invention will become clear as the description of the present invention progresses.

BRIEF DESCRIPTION OF FIGURES

The present invention may be described with a greater clarity and specificity by referring to the following figures:

FIG. 4 illustrates a perspective view of another embodiment of the vortex flowmeter with a mechanical throttling means.

FIG. 5 illustrates a perspective view of further embodiment of the vortex flowmeter with a mechanical throttling means.

FIG. 6 illustrates a cross section of yet another embodiment of the vortex flowmeter with a mechanical throttling means.

FIG. 7 illustrates a cross section of yet a further embodiment of the vortex flowmeter with a mechanical throttling means.

DESCRIPTION OF THE ILLUSTRATED EMBODIMENTS

Figure 1:
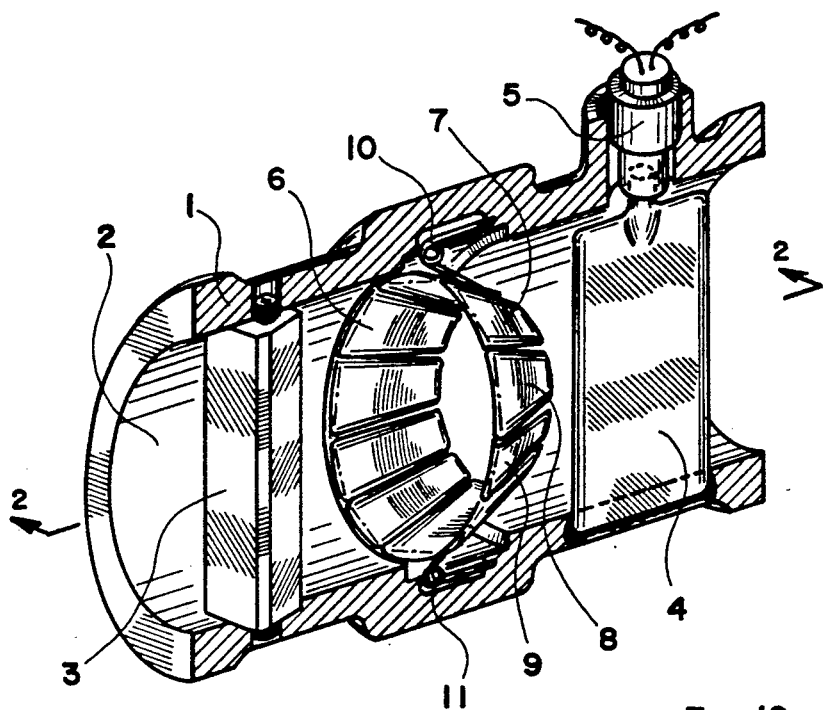
FIG. 1 illustrates a perspective view of an embodiment of the vortex flowmeter of the present invention including a mechanical throttling means for enhanced vortex detection.

In FIG. 1 there is illustrated a perspective cut-away view of an embodiment of the vortex shedding flowmeter with throttle flow passage constructed in accordance with the principles of the present invention. The flowmeter body 1 includes a flow passage 2 extending therethrough. A vortex generating bluff body 3 is disposed across the flow passage 2 such that the longitudinal axis of the bluff body 3 is perpendicular to the direction of fluid flow. A planar vortex sensor 4 disposed downstream of the bluff body 3 and parallel thereto is mechanically coupled to a transducer 5 that converts the alternating lift force generated by the vortices shed from the bluff body 3 and experienced by the planar member 4 to an alternating electrical signal, from which flow rate data is gathered. Disposed intermediate the bluff body 3 and the planar vortex sensor 4 or at the cross section of the flow passage including the planar vortex sensor 4 is a mechanical throttling means consisting of an annular nozzle 6 comprising a plurality of flaps or vanes 7, 8, 9, etc., which constitute a nozzle with variable cross sectional area as those flaps are arranged in an annular assembly and pivotably hinged at the upstream extremities thereof about hinge axes distributed coaxially about the flow passage 2. The flaps or vanes 7, 8, 9, etc. are energized by bias springs such as safety-pin type coil springs 10, 11, etc. which produce a bias force that causes the annular nozzle 6 to close and constrict the flow passage 2. At high flow rates, the bias force produced by the bias springs 10, 11, etc. is overwhelmed by the fluid dynamic force of the fluid flowing through the flow passage 21 and the annular nozzle opens up, while at low flow rates the bias force produced by the bias springs 10, 11, etc. overrides the fluid dynamic force and causes the annular nozzle 6 to close and constrict the flow passage. In general, the level of spring bias force should be selected in such a way that the annular nozzle 6 opens fully as soon as the fluid velocity becomes high enough to generate vortices with an intensity that can be readily detected by the vortex sensor without the aid of throttling. The particular embodiment of the mechanical springs providing the bias force closing the nozzle is merely an illustrative example of many different types of mechanical springs usable in place thereof. It should be mentioned that the annular nozzle 6 comprising a plurality of flaps or vanes can be replaced by a section of a flexible circular cylindrical shell folding into a conical cylindrical shell under the spring bias.

Figure 2:
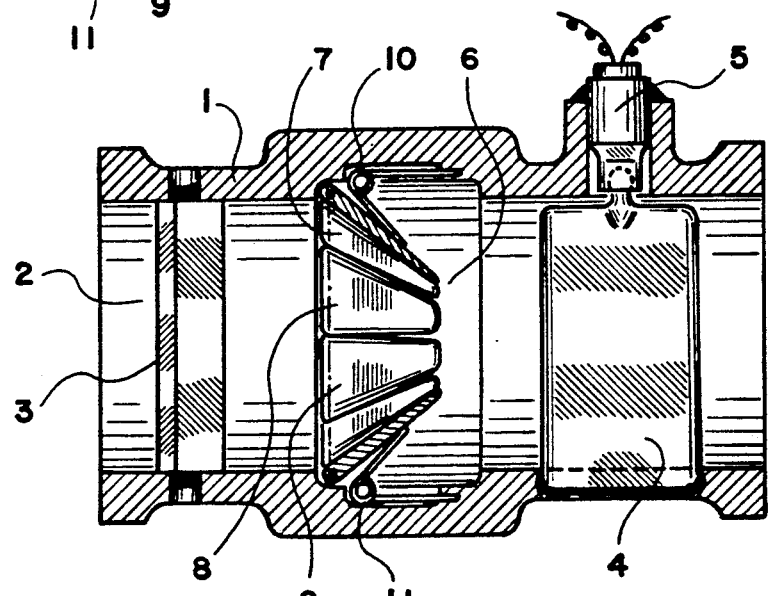
FIG. 2 illustrates a cross section of the embodiment shown in FIG. 1.

In FIG. 2 there is illustrated a cross section of the embodiment shown in FIG. 1, which cross section is taken along plane 2—2 as shown in FIG. 1. It should be noted that the combination of the planar vortex sensor 4 mechanically coupled to the transducer 5 can be replaced by any of the combination of vortex sensors and transducers shown in figures 4, 5, 6, 7, 8, and 9 as well as any others not shown in the illustrated embodiments.

Figure 3:
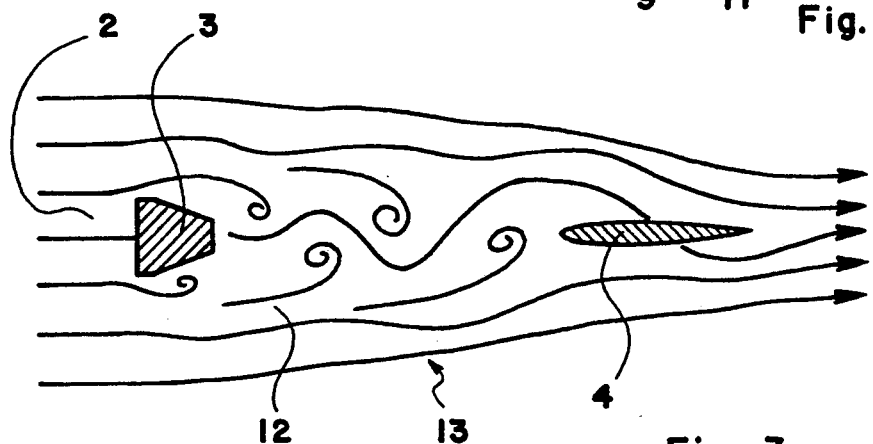
FIG. 3 illustrates a schematic diagram of the fluid flow patterns created by throttling the flow passage.

In FIG. 3 there is illustrated a schematic diagram of the fluid flow pattern occurring in the flow passage 2 of the vortex shedding flowmeter with throttle flow passage. As fluid flows past the bluff body 3, a series of vortices 12 are shed from the two opposite sides of the vortex generating bluff body 3 in an alternating pattern and travel down the flow passage 2 at the original fluid velocity $U_1$, which vortices produce a sinuating streamline of wavelength $L_1$. As the vortex streamlines 12 approach the throttle constriction 13 in the flow passage, the flow streams 12 accelerate to a new flow velocity $U_2$ and stretch out the sinuating streamlines to a new wavelength $L_2$ in proportion to the new velocity $U_2$ due to the venturi effect. Since the flow velocity and wavelength increase in proportion, the frequency $f=U/L$ remains the same. It may seem to the casual observer that there is a change in the frequency of the vortices flowing past the vortex sensor 4, but this cannot be so because a decrease in frequency would cause vortices to "pile up" at the constriction, and an increase in frequency would cause more vortices to pass the vortex sensor 4 than are created by the bluff body 3. Since the frequency of vortex shedding does not change, the flow rate data gathered therefrom also remains pertinent. The fluid flowing past the vortex sensor 4 at new velocity $U_2$ higher than the original velocity $U_1$ yields two important benefits: firstly, since the lift force generated by the sinuating streamlines and experienced by the vortex sensor 4 is proportional to $\rho U^2$, where $\rho$ is the density of the fluid, the acceleration of the fluid flow through the flow constricting nozzle tremendously increases the magnitude of the lift force and, consequently, vortices too weak to be detected by the vortex sensor 4 without the flow constricting nozzle can now be detected, which generates a tremendous increase in the capability of the flowmeter to measure low velocities of fluid flow; secondly, the acceleration of fluid flow through the flow constricting nozzle makes the elongated sinuating streamlines more sinuous, and reduces the angle-of-attack of fluid flow experienced by the vortex sensor 4 to a more favorable value for generating maximum lift force. These two benefits provide a breakthrough in vortex flowmeter technology, which greatly increases the usefulness of present day flowmeters by increasing their sensitivity at the critical low end of flow rates, when the throttling means is activated.

FIG. 4 illustrates a perspective cut-out view of another embodiment of the vortex flowmeter with mechanical throttling means. In this embodiment, vortices shed from the bluff body 14 are detected by a planar vortex sensor 15 fixedly connected to a transducer 16 which converts the alternating lift force generated by vortices shed from the bluff body 14 and experienced by the planar vortex sensor 15 to an alternating electrical signal. Disposed intermediate the bluff body 14 and the planar vortex sensor 15 or at the cross section of the flow passage including the planar vortex sensor 15 is a mechanical throttling means comprising two flaps 17 and 18 disposed in a diametrically opposing relationship, whose pivoting axes are perpendicular to the longitudinal axis of the bluff body 14. The bias force energizing the flaps 17 and 18 can be provided by any of the methods shown in the illustrated embodiments or any suitable method not shown but readily available to those skilled in the art. It should also be noted that the combination of vortex sensor 15 and transducer 16 can be replaced with other types of vortex sensors in practice.

FIG. 5 illustrates a perspective cut-out view of a further embodiment of the vortex flowmeter with mechanical throttling means. In this particular illustrated embodiment, vortices shed by the bluff body 19 are detected by a torsional vortex sensor 20 supported in a pivotable arrangement about a pivot axis perpendicular to the flow direction by the flowmeter body and mechanically coupled to a transducer 21 that converts the alternating lift force exerted on the torsional vortex sensor 20 by the vortices to an electrical signal. Disposed intermediate the bluff body 19 and the torsional vortex sensor 20 or at the cross section of the flow passage including the torsional vortex sensor 20 is a mechanical throttling means comprising two flaps 22 and 23 disposed in a diametrically opposing relationship, whose pivoting axes are parallel to the longitudinal axis of the bluff body 19. The bias force energizing the flaps 22 and 23 can be provided by any suitable method in the practice of the invention, and it should also be noted that the combination of torsional vortex sensor 20 and transducer 21 can be replaced by any other suitable vortex sensing means.

FIG. 6 illustrates a cross section of yet another embodiment of the vortex flowmeter with mechanical throttling means, which cross section is taken along a plane including the central axis of the flow passage. The flowmeter body 24 includes a flow passage 25 extending therethrough. Vortices shed by the bluff body 26 are detected an ultrasonic sensor comprising an ultrasonic transmitter 27 and an ultrasonic receiver 28. Disposed intermediate the bluff body 26 and the ultrasonic vortex sensor or at a cross section of the flow passage including the ultrasonic vortex sensor is a mechanical throttling means comprising two flaps 29 and 30. In this particular illustrated embodiment, the bias force energizing the two flaps 29 and 30 is gravity force. The upper flap 29 is simply constructed and the weight of the overhanging portion thereof causes it to hang down into the flow passage 25, while the lower flap 30 has an overhanging portion of lightweight construction and includes a counterweight disposed on the opposite side across the pivot axis of the flap such that the weight of the counterweight causes the flap 30 to protrude upward into the flow passage 25. It should be noted that while this particular illustrated embodiment shows the direction of ultrasonic transmittance to be in a direction perpendicular to the longitudinal axis of the bluff body, the direction of transmittance can be rotated so that the direction of transmittance is parallel to the longitudinal axis of the bluff body 26. It should also be noted that the ultrasonic vortex sensor can be replaced by any other suitable vortex sensor.

FIG. 7 illustrates a cross section of yet a further embodiment of the vortex flowmeter with mechanical throttling means, which cross section is equivalent to that shown in FIG. 6. The construction of this embodiment is identical to that shown in FIG. 6 with two exceptions: firstly, the ultrasonic vortex sensor of FIG. 6 has been replaced with a vortex sensing pressure probe 31 including two pressure sensing ports 32 and 33 respectively open to the two opposite side surfaces of the probe 31 and leading to a capacitive device 34 which converts fluctuating pressure associated with the vortices and detected by the pressure sensing probe 31 to electrical data $S_{OUT}$ providing flow rate; secondly, the mechanical throttling means of FIG. 6 comprising two flaps has been replaced by a mechanical throttling means comprising a single flap 35 pivotable about a pivot axis perpendicular to the longitudinal axis of the bluff body 36. In this particular embodiment, the bias force energizing the flap 35 is gravity force. It should be noted that the vortex sensing pressure probe 31 can be replaced by any other suitable vortex sensor. It should also be noted that the flap 35 may be installed in an alternative arrangement wherein it pivots about a pivot axis parallel to the longitudinal axis of the bluff body 36.

Figure 8:
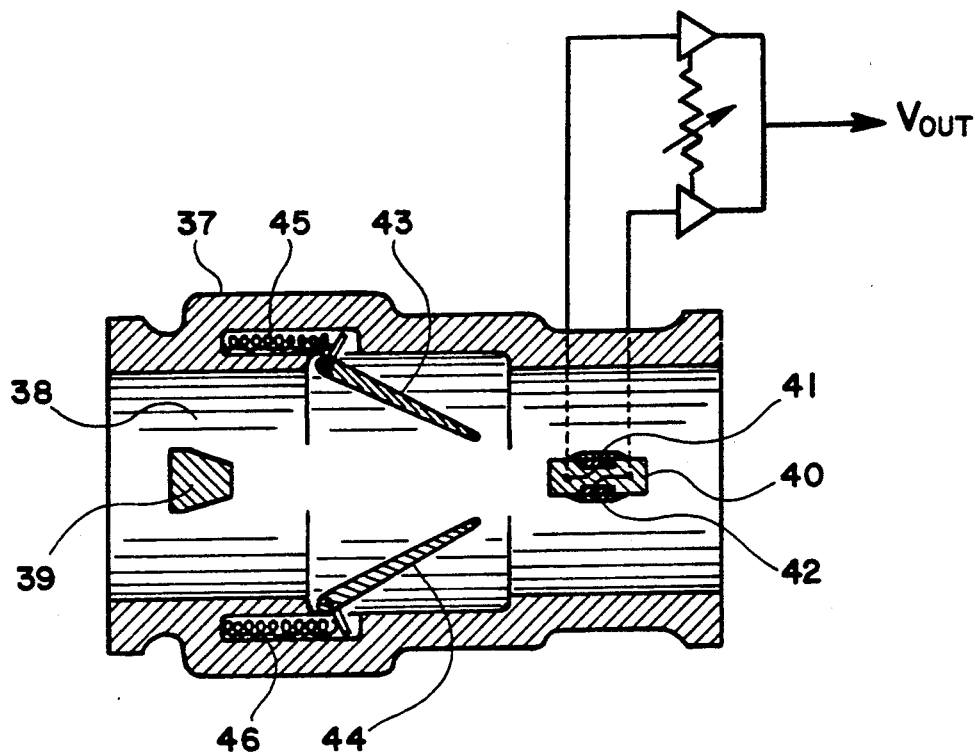
FIG. 8 illustrates a cross section of still another embodiment of the vortex flowmeter with a mechanical throttling means.

FIG. 8 illustrates a cross section of still another embodiment of the vortex flowmeter with mechanical throttling means, which cross section is taken along a plane including the central axis of the flow passage and perpendicular to the longitudinal axis of the bluff body. The flowmeter body 37 includes a flow passage 38 extending therethrough. The vortices shed from the bluff body 39 are detected by a vortex sensing pressure probe 40 including a pair of piezo-electric pressure sensors 41 and 42 disposed on opposite sides of the probe 40. The electrical outputs from the pair of piezo-electric pressure sensors 41 and 42 are combined to produce an electrical signal $V_{OUT}$ yielding flow rate data substantially free of noise. Disposed intermediate the bluff body 39 and the pressure probe 40 or at the cross section of the flow passage including the pressure sensing probe 40 is a mechanical throttling means comprising two flaps 43 and 44. The bias force energizing the two flaps 43 and 44 is provided by a pair of compression coil springs 45 and 46, respectively. It should be noted that the pressure sensing probe 40 can be replaced by any other suitable vortex sensor.

Figure 9:
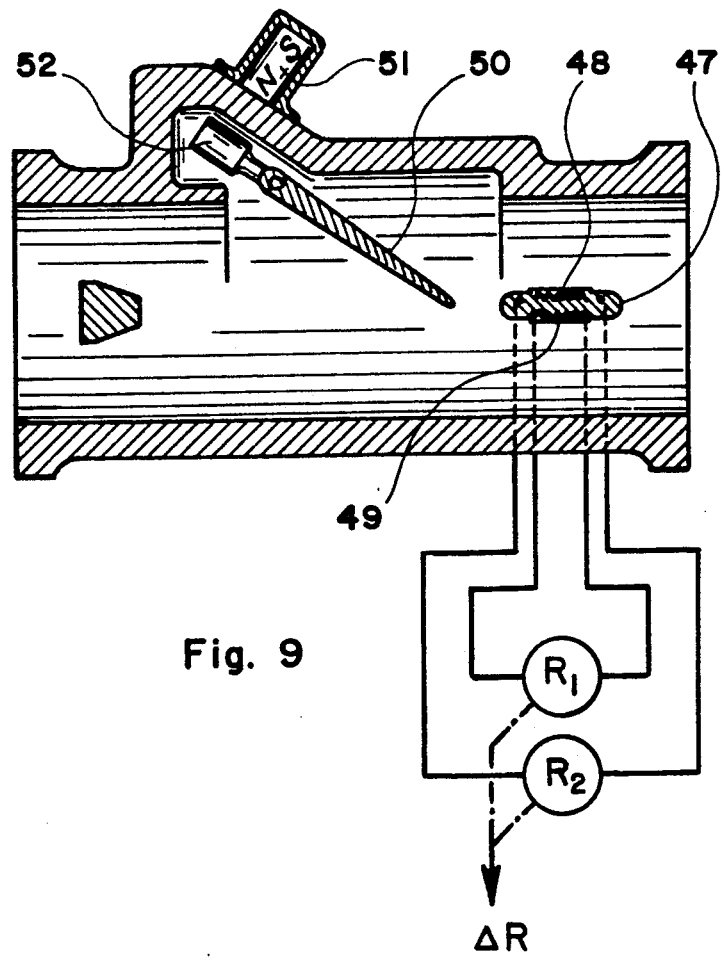
FIG. 9 illustrates a cross section of still a further embodiment of the vortex flowmeter with a mechanical throttling means.

FIG. 9 illustrates across section of still a further embodiment of the vortex flowmeter with mechanical throttling means, which cross section is equivalent to that shown in FIG. 8. This embodiment has essentially the same construction as that shown in FIG. 8 with two exceptions: firstly, the pressure probe of FIG. 8 has been replaced by a vortex sensing probe 47 including a pair of hot wire flow detectors 48 and 49 respectively disposed on the two opposite sides of the probe 47. The resistances of the flow detectors 48 and 49 are combined to obtain an electrical signal $\Delta R$ varying as a function of sinuating flow and yielding data on flow rate. Secondly, the mechanical throttling means of FIG. 8 comprising two flaps has been replaced by a mechanical throttling device comprising a single flap 50 which may also be installed at a new position rotated 90° from the position shown. The bias force energizing the flap 50 is provided by a magnet 51 acting on a ferromagnetic attachment 52 fixed to the flap 50 at the opposite side from the pivot axis thereof. It should be noted that the vortex sensing probe 47 can be replaced by any other suitable vortex sensor.

The vortex flowmeter of the present invention should include a data processor determining the fluid velocity or volume flow rate of the fluid from the vortex shedding frequency that is the same as the frequency of the alternating electrical signal supplied by the transducer, and the mass flow rate of the fluid as a function of the frequency of the alternating electrical signal equal to the vortex shedding frequency and the amplitude thereof representing the fluctuating fluid dynamic force proportional to $\rho U^2$ that is generated by the vortices. The vortex flowmeter may furhter include a data processor that determines the density of fluid from the ratio of the mass flow rate to the volume flow rate.

While the principles of the present invention have now been made clear by the illustrative embodiments, there will be many modifications of the structures, arrangements, proportions, elements, and materials, which are immediately obvious to those skilled in the art and particularly adapted to specific working environments and operating conditions in the practice of the invention without departing from those principles. It is not desired to limit the inventions to the particular illustrative embodiments shown and described, and accordingly, all suitable modifications and equivalents may be regarded as falling within the scope of the inventions as define by the claims which follow.

I claim:

1. An apparatus for measuring flow rate of a fluid comprising in combination:
   a) a body including a flow passage extending therethrough;
   b) a vortex generator of elongated cylindrical shape disposed across the flow passage;
   c) means for detecting vortices shed from the vortex generator disposed downstream of the vortex generator, wherein said means for detecting vortices includes signal generating means providing a fluctuating electrical signal as a measure of flow rate of a fluid; and
   d) means for throttling the flow passage disposed downstream of the vortex generator, said means for throttling the flow passage including a bias means causing constriction of the flow passage and increasing flow velocity of the fluid passing by the means for detecting vortices when said bias means overcomes fluid dynamic force of the fluid flow, and the fluid dynamic force opens up said constriction when the fluid dynamic force overcomes said bias means.

2. A combination as set forth in claim 1 wherein said bias means comprises mechanical spring bias.

3. A combination as set forth in claim 1 wherein said bias means comprises Earth's gravity bias.

4. A combination as set forth in claim 1 wherein said bias means comprises magnetic force bias.

* * * * *